No. 12,131. REISSUED JULY 21, 1903.

C. M. PALMER.

SHEARING MACHINE.

APPLICATION FILED JUNE 5, 1903.

Witnesses:-
Earl S. Crawford
William H. Hall

Inventor:-
Chester M. Palmer
by Poole & Brown
his Attorneys

No. 12,131. Reissued July 21, 1903.

UNITED STATES PATENT OFFICE.

CHESTER M. PALMER, OF FOND DU LAC, WISCONSIN.

SHEARING-MACHINE.

SPECIFICATION forming part of Reissued Letters Patent No. 12,131, dated July 21, 1903.

Original No. 720,469, dated February 10, 1903. Application for reissue filed June 5, 1903. Serial No. 160,274.

*To all whom it may concern:*

Be it known that I, CHESTER M. PALMER, of Fond du Lac, in the county of Fond du Lac and State of Wisconsin, have invented certain new and useful Improvements in Shearing-Machines; and I do hereby declare that the following is a full, clear, and exact description thereof, reference being had to the accompanying drawings, and to the letters of reference marked thereon, which form a part of this specification.

This invention relates to improvements in animal-shearing machines; and the invention consists in the matters hereinafter set forth, and more particularly pointed out in the appended claims.

Figure 1:
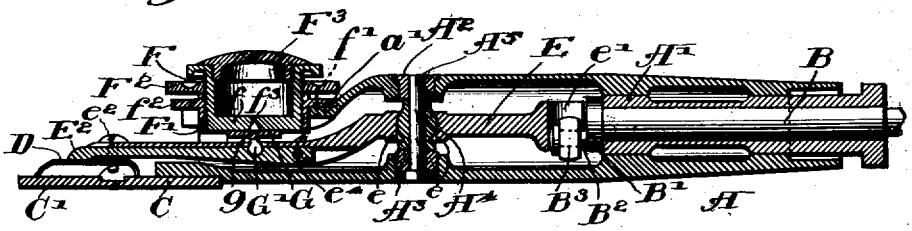
Figure 2:
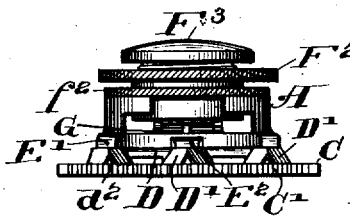
Figure 3:
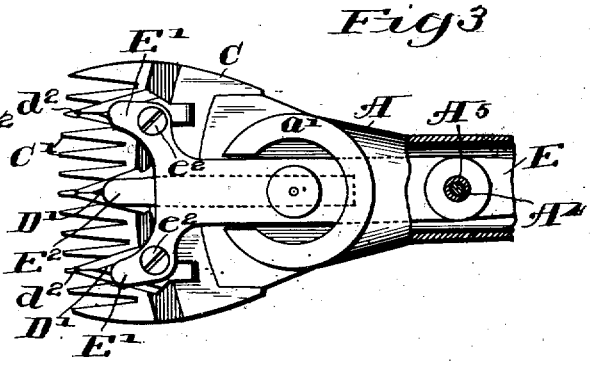
Figure 4:
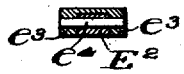
Figure 6:
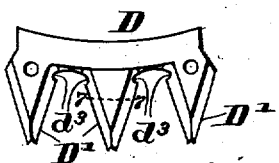
Figure 5:
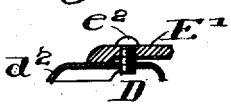
Figure 7:
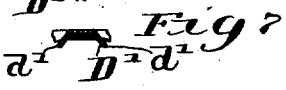
Figure 8:
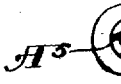

In the drawings, Figure 1 is a horizontal section of a shearing-machine embodying my improvements. Fig. 2 is an end view thereof looking toward the cutter. Fig. 3 is a top plan view of the front or outer end of the machine with parts removed. Fig. 4 is a cross-section taken on line 4 4 of Fig. 1. Fig. 5 is a detail illustrating the manner of connecting the operating-lever with the knife. Fig. 6 is a plan view of the cutter removed from the other parts. Fig. 7 is a transverse section taken on line 7 7 of Fig. 6. Fig. 8 is a fragmentary bottom plan view of the adjusting-screw for the operating-lever and the bushing through which said screw extends.

As shown in said drawings, A designates a hollow casing in which the parts of the operating devices are contained and which is so formed as to constitute a handle by which the machine may be manually manipulated.

B designates a main operating-shaft which is mounted in a bushing A′, secured in the rear end of the casing, and said operating-shaft is adapted to be connected with a source of power through the medium of a flexible shaft. (Not shown.) The bottom wall of the casing, at the front end thereof, is made flat, and to the front end of the flat portion of the bottom wall is attached a flat guard-finger plate C, having a plurality of forwardly-tapered guard-fingers C′. D designates as a whole a cutting-knife which reciprocates transversely on said guard-finger plate, and the blades D′ of said knife coöperate with the guard-fingers to produce the shearing or cutting action. E designates as a whole a vibratory operating-lever for said knife D, said lever vibrating on an axis transverse to the plane of the guard-fingers. The pivot for said operating-lever E consists of a sleeve $A^4$, which is mounted on a pin or bolt $A^5$, which extends transversely through the casing and has screw-threaded connection therewith. The sleeve $A^5$ is enlarged between its ends and is made rounded or generally spherical in said enlarged part to constitute the bearing for the lever, and the operating-lever is provided with a bearing-socket *e*, which fits upon said spherically-formed bearing-sleeve. One end of said bearing-aperture is made cylindrical to permit the bearing-sleeve to be inserted into said bearing-socket, while the other end of said socket is made spherical to fit the correspondingly-shaped engaging part of the sleeve. Said bolt $A^5$, on which the sleeve $A^4$ is mounted, has screw-threaded engagement at its upper end with a bushing $A^2$, which is exteriorly screw-threaded and fits an interiorly-screw-threaded upwardly-opening aperture in the upper casing-wall. Said bolt also extends at its lower end through another bushing $A^3$, which has exterior screw-threaded connection with an opening in the bottom wall of the casing and located in alinement with the bushing $A^2$. The bearing-sleeve $A^4$ rests at its lower end on the upper end of the bushing $A^3$, whereby said sleeve may be adjusted vertically by raising and lowering the bushing $A^3$. For the purpose of adjusting said bushing it is provided at its lower end with a transverse slot *a*, as shown in Fig. 7, which is adapted to be engaged by a screw-driver or the like. Desirably a short space will be left between the upper end of said bearing-sleeve and the lower end of the upper bushing $A^2$ to permit of such adjustment of the sleeve. After said bearing-sleeve has been adjusted by means of the bushing $A^3$ the bolt $A^5$ is turned upwardly tight against said bushing and holds the same in place.

The operative connections between the operative shaft B and the operating-lever E consist of a crank-disk B′ on the operating-shaft, a wrist-pin $B^2$ on said disk, and a roller $B^3$ on the wrist-pin, which occupies a rearwardly-opening notch *e′*, formed between fork-arms at the rear of said lever E in the manner clearly shown in Fig. 1. Said notch $e'$ is open at its upper and lower sides, so as to permit of the vertical adjustment of the operating-lever hereinbefore described.

The forward end of the operating-lever E is downwardly bent or offset in front of its pivot to bring the same generally level with the plane of the guard-finger plate, and said forward end of the lever is bifurcated, and the arms E' E' thereof bear upon the opposite sides of the cutter D. As herein shown, said cutter D has three separate teeth or sections D' D', and said arms E' of the operating-lever bear upon the two outer teeth or sections of the cutter, as shown in Fig. 3, and are shown as connected therewith by means of bolts $e^2$, which extend downwardly through said fork-arms and into apertures in the cutter, as most clearly shown in Fig. 5. Said operating-lever is provided with an intermediate bearing member consisting of a bar $E^2$, which is pivoted at its rear end between laterally-separated lugs $e^3$, depending from the operating-lever in front of its pivot, as shown in Figs. 1 and 4, said bar being pivotally connected with said lugs through the medium of a horizontal pivot-pin $e^4$, which extends transversely through the bar and lugs. The intermediate bar bears at its outer or forward end against the intermediate tooth or section of the cutter, as shown in Figs. 2 and 3. A tension device is applied to said bar for varying the pressure of the cutter on the guard-fingers, so that the same will assume proper cutting relation with respect to said fingers notwithstanding wear of said parts. Said tension device is made as follows:

F designates a hollow tension-screw, which has a closed lower end $f$ and has exterior screw-threaded connection with a bushing F', which is seated in a suitable opening in the upper wall of the casing, at the front end thereof. Said bushing is attached to said casing by means of screws $f'$, which pass through a radial flange $f^2$ on the upper end of the bushing and into a flat curved seat $a'$, formed on the upper casing-wall, said flange fitting flat on said seat.

$F^2$ designates a jam-nut, which has exterior screw-threaded engagement with the tension-screw and is adapted to be turned downwardly upon the upper end of the bushing F' to lock the tension-screw in place. The upper open end of said hollow tension-screw is closed by a cap $F^3$, which has screw-threaded connection therewith. The lower face of the closed end of the tension-screw is flat and is parallel with the plane of the upper surface of the guard-fingers C'. Interposed between said lower closed end of the set-screw and the operating-lever is a friction-plate G, which has a flat upper surface which frictionally engages the lower surface of the tension-screw and is provided at its lower side with a depending stud G', which is rounding at its lower end and fits in a correspondingly-shaped socket in the upper surface of the intermediate bearing member $E^2$ of the operating-lever. The said stud G extends downwardly through on opening in the operating-lever in line with said notch of the intermediate bearing member, said opening being made somewhat larger than the lug to permit the necessary oscillation of the latter in the operation of the parts. The oscillatory connection of the friction-plate with the lever insures that the plate and the lower end of the tension-screw shall always bear a parallel relation notwithstanding unequal wear in different parts of the screw and plate or cutter and guard-fingers, whereby direct and uniform pressure is at all times exerted by the screw on said cutter. Pressure is exerted by said tension-screw downwardly upon the intermediate bearing member $E^2$ of the operating-lever and through said intermediate member and its pivot upon said main portion of the operating-lever, so that the pressure of said tension-screw is exerted on both arms E' and the intermediate bearing member $E^2$ to press the cutter D against the guard-fingers. By reason of the hinged connection of the intermediate member with the main portion of the lever pressure is more accurately transmitted to said cutter than if said parts were made rigid, as in the latter case should there be any inaccuracies of fit of the operating-lever upon the cutter the tension exerted at one side of the lever might be greater or less than at the other side of the lever. The construction of the pivot for the operating-lever is such that said pivot may be slightly raised or lowered to properly adjust the lever to the cutter. Through the action of the tension device the pressure of the lever on its pivot is downward, so that in case of wear between said parts the lever will tend to drop into a lower position, and if no means were provided to compensate for such wear the proper adjustment between the outer or bearing end of the lever and the cutter would be disturbed, so as to impair the shearing or cutting relation of the cutter-blades to the guard-fingers. With my construction, however, I am enabled to maintain the pivot level of the lever in the same position notwithstanding such wear and at all times to preserve the initial and accurate adjustment of the cutter with respect to the guard-fingers. The connection between said operating-lever and the shaft B is such that the raising of the lever for proper adjustment thereof will not effect the operative connection between said lever and shaft, the roller of the pin $B^2$ sliding vertically in the notch in said shaft when said operating-lever is moved.

As a further and separate improvement the bottom or closed end $f$ of the hollow tension-screw is provided with a small orifice $f^3$, and the friction-plate G is provided on its upper surface, in line with said orifice, with a depression $g$, as shown in Fig. 1. It is intended that the hollow interior of the tension-screw shall be filled with a lubricating-oil, and the parts are so designed that the oil passes through said orifice $f^3$ upon the plate to lubricate the friction-surfaces of the plate and tension-screw. The central depression of the plate enables the oil to flow freely to the plate when the orifice is in line with said depression and also acts to hold the lubricant in a small body to be effectively applied to the bearing parts.

Each of the teeth or sections of the cutter is made tapered or pointed from their inner to their outer ends. Said teeth or sections are made generally of concavo-convex shape in cross-section and of substantially equal thinness from one side margin of each to the other, and the side margins $d'$ $d'$, Fig. 6, of each tooth or section constitute the cutting-blades thereof, which blades are sharpened at their edges and bear against the upper faces of the guard-fingers. Said teeth or sections are continued at their outer ends to almost a point, and each tooth is provided at its outer end between the blades with an inwardly-extended V-shaped notch $d^2$, as most clearly shown in Fig. 6. Said notches serve to slightly separate the blades of each tooth at the outer end thereof, thereby giving to the ends of the blades capacity to flex slightly in order to adjust themselves to the guard-fingers properly under the action of the tension device. The rear portions or bases of the teeth or sections D' are provided on their opposite margins at the rear ends of the blades with notches $d^3$, Fig. 6, which somewhat free the rear end of each blade from the body of the cutter, so that said blade is free to flex slightly throughout its active or cutting portion. By providing the outer ends of the teeth or sections with the V-shaped notches $d^2$, before mentioned, I am enabled to retain practically the maximum length of the effective cutting portion of the blade and at the same time render the outer ends of said blade suitably flexible. A further advantage of providing said teeth or sections with the V-shaped notches described is that said teeth may be made to assume a relatively sharp point, while at the same time the forward ends of the blades are unconnected and separated such distances as to give the desired flexibility to the blades. Where said teeth or sections are formed with a sharp point, the forward or outer ends of the blades are connected, so as to prevent the flexibility desired at the outer ends of the blades. The construction described is also superior to a construction wherein the outer ends of the blades are cut off square or abrupt, as in my improved construction the ends of the teeth are not so blunt, while at the same time the blades possess the same or greater flexibility.

Changes may be made in the structural details without departing from the spirit of my invention, and I do not wish to be limited to such details except as hereinafter made the subject of specific claims.

I claim as my invention—

1. In a shearing-machine, the combination with a casing, guard-fingers at the front end thereof, a cutter movable on said fingers, a vibratory operating-lever connected with and pressing said cutter against the guard-fingers and a tension device acting on said lever, of a pivotal support for said lever comprising a bolt extending transversely through said casing and having screw-threaded connection at one end with said casing, a sleeve on said bolt provided with a rounded or spherical bearing-surface adapted to engage a correspondingly-shaped aperture in the lever, and a bushing through which said bolt passes and on which said sleeve rests, said bushing being adjustably connected with the casing.

2. An animal-shearing machine comprising a casing, guard-fingers at the front end thereof, a cutter movable on said guard-fingers, a vibratory operating-lever provided with laterally-separated arms which bear upon the cutter at the sides thereof, and with a pivoted intermediate bearing member which bears at its forward end upon the intermediate part of the cutter, and a tension device acting on said lever to press said cutter against the guard-fingers, embracing a friction-plate, interposed between said intermediate member of the lever and an opposing part of the casing, said friction-plate being capable of oscillating with respect to the part on which it is supported.

3. In an animal-shearing machine, the combination with a casing, guard-fingers at the front end thereof, a cutter movable on said guard-fingers, and a vibratory operating-lever provided with laterally-separated arms which bear upon the cutter and with a pivoted intermediate bearing member which bears at its outer end upon the intermediate part of the cutter, of a tension device embracing a screw extending through said casing and provided with an inwardly-facing friction-surface, and a friction-plate on said intermediate part of the lever and capable of oscillating thereon and having a friction-surface which opposes the friction-surface of the screw and which slides on said screw.

4. In a shearing-machine, the combination with a casing, guard-fingers at the front end thereof, a cutter movable on said guard-fingers, a vibratory operating-lever provided with laterally-separated arms which bear on said cutter, and with an intermediate pivotal member which bears at its outer end against the intermediate part of the cutter, a tension device acting on said lever between its pivot and said cutter, a rotative operating-shaft and loose driving connections between said shaft and lever, in rear of the pivot of said lever, of means for adjusting the pivot-bearing of said lever in a direction transverse to the plane of vibration thereof.

5. In an animal-shearing machine, the combination with a casing, guard-fingers at the front end thereof, a cutter movable on said guard-fingers and a vibratory operating-lever connected with and pressing said cutter against the guard-fingers, of a tension device embracing a friction-plate interposed between said operating-lever and an opposing part of the casing, said friction-plate having oscillatory movement with respect to the part on which it is supported, and means for automatically lubricating the bearing-surfaces of said tension device.

6. In a shearing-machine, the combination with a casing, guard-fingers at the front end thereof, a cutter movable on said guard-fingers and a vibratory operating-lever connected with and pressing said cutter against the guard-fingers, of a tension device embracing a hollow screw extending through said casing and provided with an inwardly-facing bearing-surface adapted to engage an opposing bearing-surface on the lever, the inner end of said screw being provided with an orifice through which a lubricant may pass from the interior of the screw to said bearing-surfaces.

7. In a shearing-machine, the combination with a casing, guard-fingers at the front end thereof, a cutter movable on said guard-fingers and a vibratory operating-lever connected with and pressing said cutter against the guard-fingers, of a tension device embracing a hollow screw extending through said casing and provided with an inwardly-facing bearing-surface adapted to engage an opposing bearing-surface on the lever, the inner end of said screw being provided with an orifice through which a lubricant may pass from the interior of said screw to said bearing-surfaces, and said lever-bearing surface being provided in line with said orifice with a depression.

8. In a shearing-machine, the combination with a casing, guard-fingers at the front end thereof, a cutter movable on said guard-fingers, and a vibratory operating-lever connected with and pressing said cutter against the guard-fingers, of a tension device embracing a hollow screw extending through said casing and provided with an inwardly-facing bearing-surface and a friction-plate having loose or oscillatory connection with the operating-lever against which the inner end of the tension-screw bears, the said inner end of the screw being provided with an orifice through which a lubricant may pass from the interior of said screw to the bearing-surfaces of the screw and said friction-plate.

9. A cutter for shearing-machines having a plurality of teeth, the side margins of which constitute cutting-blades, the said teeth being provided at their pointed ends with rearwardly-extending V-shaped notches whereby the blades are separated at their forward ends.

10. A cutter for shearing-machines having a plurality of teeth, the side margins of which constitute cutting-blades, said blades being disconnected from the body of the cutter at the rear ends thereof, and the teeth being provided at their pointed ends with rearwardly-extending notches which separate the forward ends of the blades.

11. In a shearing-machine, the combination with the guard-fingers, of a cutter movable on said guard-fingers, the side margins of the teeth of said cutter constituting cutting-blades, and said teeth being provided at their pointed ends with rearwardly-extending notches which separate the forward ends of the blades.

12. In a shearing-machine, the combination with a casing, guard-fingers at the front end thereof, a cutter movable on said guard-fingers, and a vibratory operating-lever connected with and pressing said cutter upon the guard-fingers, of a tension device embracing a friction-plate interposed between said operating-lever and an opposing part of the casing, and means for applying a lubricant to the bearing-surfaces of the tension device.

13. In a shearing-machine, the combination with a casing, guard-fingers at the front end thereof, a cutter movable on said guard-fingers, and a vibratory operating-lever connected with and pressing said cutter upon the guard-fingers, of a tension device embracing a friction-plate interposed between said operating-lever and an opposing part of the casing, said friction-plate having oscillatory movement on the part on which it is supported, and means for applying a lubricant to the surface of the friction-plate.

In testimony that I claim the foregoing as my invention I affix my signature, in the presence of two witnesses, this 16th day of May, A. D. 1903.

CHESTER M. PALMER.

Witnesses:
WILLIAM L. HALL,
GEORGE R. WILKINS.